JOHN B. STANHOPE.
Improvement in Machines for Cutting Barrel Heads.
No. 124,917.            Patented March 26, 1872.

JOHN B. STANHOPE.

Improvement in Machines for Cutting Barrel Heads.

No. 124,917. Patented March 26, 1872.

Witnesses.
John Phillips
William H. Camman

Inventor.
John B. Stanhope
C. S. Whitman Attorney 124,917

UNITED STATES PATENT OFFICE.

JOHN B. STANHOPE, OF PHILADELPHIA, PENNSYLVANIA.

IMPROVEMENT IN MACHINES FOR CUTTING BARREL-HEADS.

Specification forming part of Letters Patent No. 124,917, dated March 26, 1872.

SPECIFICATION.

*To whom it may concern:*

Be it known that I, J. B. STANHOPE, of Philadelphia, in the county of Philadelphia, in the State of Pennsylvania, have invented an Improvement in Machines for Cutting Barrel-Heads; and I do hereby declare that the following is a full and exact description thereof, reference being had to the accompanying drawing and to the letters of reference marked thereon.

*Description of the Nature and Object of the Invention.*

My invention has for its object so to construct the machine as to be capable of sawing out any shape of head that may be desired. For this purpose I lengthen the spindle in the flange A, which holds the barrel-head, and fasten upon it a pattern, B, the shape of whose periphery corresponds to that which the barrel-head is to assume. If, for example, I wish to saw out a barrel-head which shall be an ellipse, one of whose diameters shall be one-half ($\frac{1}{2}$) inch greater than the other, the templet or pattern will necessarily be elliptical, with the two diameters varying one-half ($\frac{1}{2}$) inch. In order to cause the pattern to have the desired effect upon the barrel-head it is necessary that the saw should move away from and toward the center of the spindle C, and be governed in this movement by the pattern, for which purpose the frame D, in which the saw-mandrel runs, is fastened to the plate E. To this bed is secured the adjustable steel toe F, which is kept constantly against the pattern by the weight G, which is attached to the plate by means of the chain running over the pulley H in Fig. 1.

In sawing out barrel-heads it is desirable to make them broader across than they are in the direction of the grain, so that the barrel-head, when fully shrunk, will be nearer to a perfect circle than would otherwise be the case; hence, it is obvious that, as the head shrinks, the tighter all the seams become, thus rendering the barrel less liable to leak.

Figure 1:
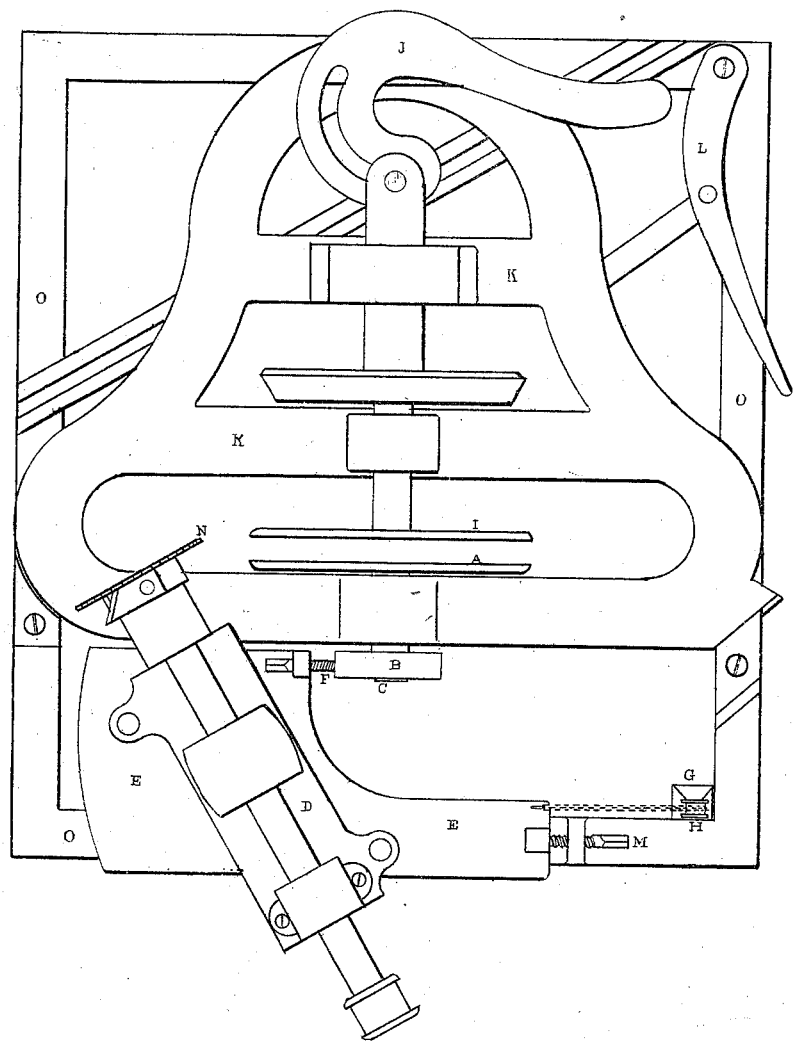
Figure 1 is a plan of the machine.
Figure 2:
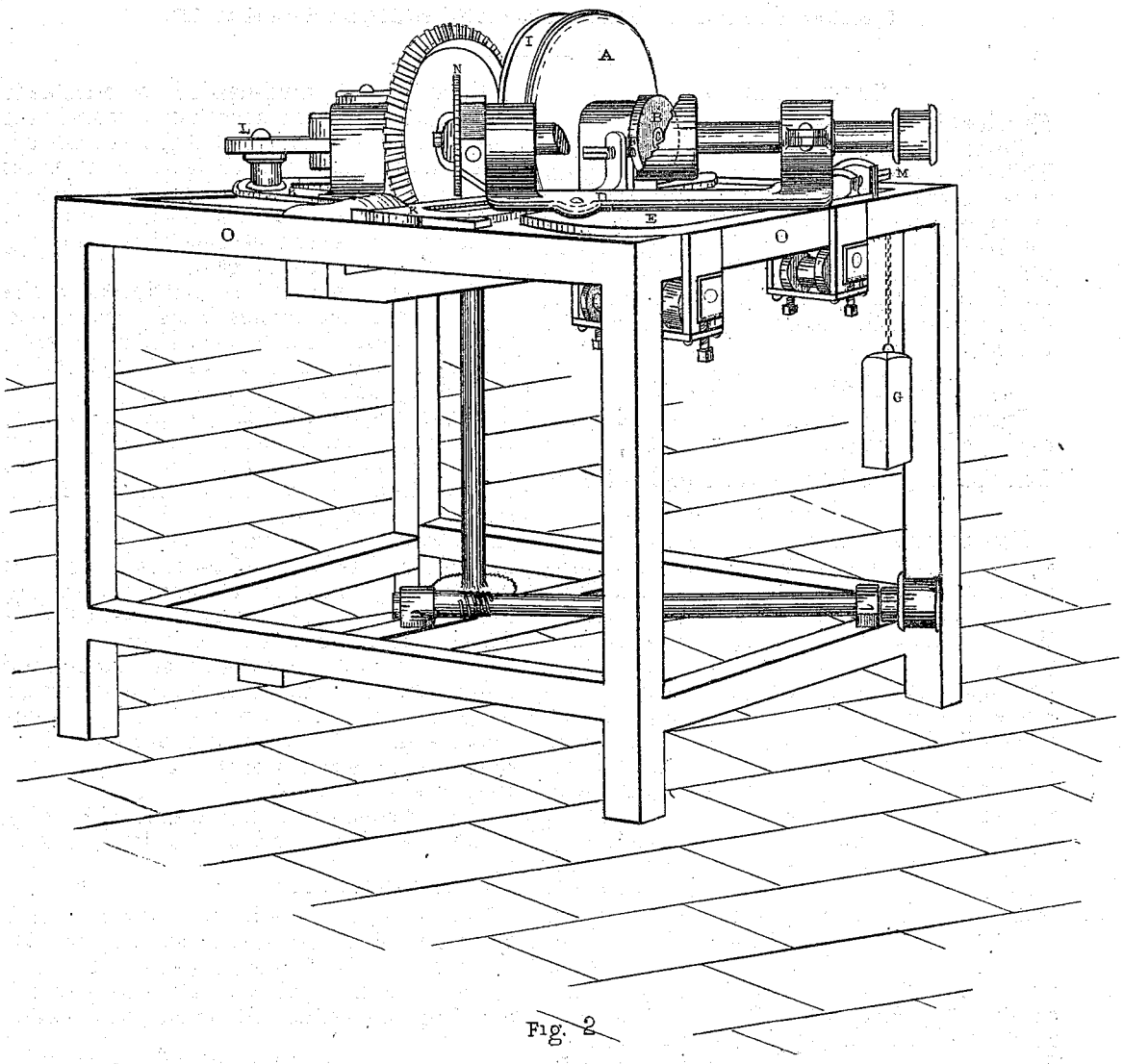
Fig. 2 is a perspective view.

The head to be sawed is introduced into the space between the flanges A and I, and is held firmly between them by means of the lever J, Fig. 1. The frame K, Fig. 1, is then moved forward by means of the lever L, Fig. 1, which throws the spindle of the flange I into gear, causing the head to turn toward the rapidly-revolving saw; at the same time the steel toe F comes in contact with the pattern B, which regulates the shape of the head. M is a stopping-screw, which regulates the point to which the sliding plate E can follow the weight. By this stopping-screw the difference between the two diameters of the head may be varied without changing the pattern or templet; for if the sliding plate touches the stopping-screw before the toe F arrives at the lowest part on the periphery of the pattern-wheel B, it is evident the saw will not move so far away from and toward the center of the pattern as would otherwise be the case.

The principle of turning irregular forms by means of a templet or pattern I do not claim; but

What I claim is—

The frame K, levers L and J, flanges I and A, pattern B, pattern-toe F, sliding plate E, bearings D, saw N, stopping-screw M, frame O, weight G, and pulley H, all arranged and operating together as and for the purposes described.

JOHN B. STANHOPE.

Witnesses:
JOHN PHILLIPS,
WILLIAM H. CARMAN.